United States Patent
Hwang et al.

(10) Patent No.: US 12,024,462 B2
(45) Date of Patent: Jul. 2, 2024

(54) METHOD OF MANUFACTURING FLEXIBLE COVER WINDOW

(71) Applicant: UTI INC., Chungcheongnam-do (KR)

(72) Inventors: Jae Young Hwang, Gyeonggi-do (KR); Hak Chul Kim, Chungcheongnam-do (KR); Kukhyun Sunwoo, Gyeonggi-do (KR); Tea Joo Ha, Chungcheongnam-do (KR); Dong Moon Shin, Chungcheongnam-do (KR); Jung Seok Woo, Chungcheongnam-do (KR)

(73) Assignee: UTI INC. (KR)

( * ) Notice: Subject to any disclaimer, the term of this patent is extended or adjusted under 35 U.S.C. 154(b) by 821 days.

(21) Appl. No.: 17/036,164

(22) Filed: Sep. 29, 2020

(65) Prior Publication Data
US 2021/0107826 A1    Apr. 15, 2021

(30) Foreign Application Priority Data

Oct. 15, 2019 (KR) .................. 10-2019-0127616

(51) Int. Cl.
*C03C 15/00* (2006.01)
*C03C 21/00* (2006.01)
*H05K 5/00* (2006.01)

(52) U.S. Cl.
CPC ............ *C03C 15/00* (2013.01); *C03C 21/002* (2013.01); *C03C 2218/34* (2013.01); *H05K 5/0017* (2013.01)

(58) Field of Classification Search
None
See application file for complete search history.

(56) References Cited

U.S. PATENT DOCUMENTS

| 4,155,627 A * | 5/1979 | Gale | G02B 27/4238 |
| | | | 359/568 |
| 5,245,213 A * | 9/1993 | Huang | H01L 21/31056 |
| | | | 257/644 |

(Continued)

FOREIGN PATENT DOCUMENTS

| JP | 2011-504278 A | 2/2011 | |
| KR | 101684344 B1 * | 12/2016 | ............ C03B 27/00 |

(Continued)

OTHER PUBLICATIONS

KR-1970921-B1 translation from PE2E (Year: 2019).*

(Continued)

*Primary Examiner* — Jodi C Franklin
(74) *Attorney, Agent, or Firm* — Mendelsohn Dunleavy, P.C.

(57) ABSTRACT

A method of manufacturing a flexible cover window is proposed. The flexible cover window includes a planar part and a folded part extending continuously from the planar part, wherein the folded part is thinner than the planar part. The method includes: forming a photoresist layer on a glass substrate, patterning the photoresist layer to form a gradation resist pattern layer for forming the folded part on the glass substrate, forming the folded part having an inclined portion formed between the folded part and the planar part using the gradation resist pattern layer as a mask, removing the gradation resist pattern layer, and reinforcing the glass substrate.

11 Claims, 8 Drawing Sheets

(56) References Cited

U.S. PATENT DOCUMENTS

| | | | |
|---|---|---|---|
| 9,711,754 B2 * | 7/2017 | Lee | H10K 50/8426 |
| 10,680,198 B2 * | 6/2020 | Eo | H05K 5/0017 |
| 2012/0128938 A1 * | 5/2012 | Rudigier-Voigt | G03F 7/004 |
| | | | 156/345.19 |
| 2012/0135195 A1 * | 5/2012 | Glaesemann | B23K 26/0624 |
| | | | 428/156 |
| 2012/0218640 A1 * | 8/2012 | Gollier | C03C 15/00 |
| | | | 359/601 |
| 2014/0103480 A1 * | 4/2014 | Lin | H01L 31/18 |
| | | | 257/466 |
| 2014/0106172 A1 * | 4/2014 | Dejneka | C03C 3/093 |
| | | | 501/67 |
| 2014/0365688 A1 * | 12/2014 | Lee | H10N 70/882 |
| | | | 257/421 |
| 2015/0017389 A1 * | 1/2015 | Chai | G03F 7/16 |
| | | | 428/156 |
| 2016/0137548 A1 * | 5/2016 | Cabral, Jr. | C03C 17/06 |
| | | | 65/36 |
| 2016/0326050 A1 * | 11/2016 | Lee | C03C 21/002 |
| 2017/0354999 A1 * | 12/2017 | Seo | C23C 16/0245 |
| 2018/0009697 A1 * | 1/2018 | He | C03B 23/0307 |
| 2018/0113490 A1 * | 4/2018 | Chang | B32B 17/10009 |
| 2018/0194678 A1 * | 7/2018 | Scheyvaerts | C03C 21/002 |
| 2018/0217639 A1 * | 8/2018 | Jones | G06F 1/1626 |
| 2018/0364759 A1 * | 12/2018 | Ahn | B32B 7/12 |
| 2019/0023611 A1 * | 1/2019 | Luzzato | C03C 21/002 |
| 2019/0050027 A1 * | 2/2019 | Chang | G06F 1/1652 |
| 2020/0392038 A1 * | 12/2020 | Park | H04M 1/0266 |
| 2021/0135158 A1 * | 5/2021 | Min | H10K 50/844 |
| 2021/0191467 A1 * | 6/2021 | Sunwoo | C03C 15/00 |
| 2022/0106218 A1 * | 4/2022 | Cao | C03C 3/083 |
| 2022/0291712 A1 * | 9/2022 | Baby | C03C 21/002 |

FOREIGN PATENT DOCUMENTS

| | | | | |
|---|---|---|---|---|
| KR | 10-2017-0122554 A | | 11/2017 | |
| KR | 1970921 B1 | * | 4/2019 | C03B 33/082 |
| KR | 20190113532 A | * | 10/2019 | C03C 21/002 |
| WO | WO-2019219009 A1 | * | 11/2019 | C03C 15/00 |

OTHER PUBLICATIONS

Nguyen et al. Advances in Glass Science and Technology Dec. 10, 2018 (Year: 2018).*

Wet etching with taper (Year: 2010).*

* cited by examiner

METHOD OF MANUFACTURING FLEXIBLE COVER WINDOW

CROSS REFERENCE TO RELATED APPLICATION

The present application claims priority to Korean Patent Application No. 10-2019-0127616, filed Oct. 15, 2019, the entire contents of which is incorporated herein for all purposes by this reference.

BACKGROUND OF THE INVENTION

Field of the Invention

The present disclosure relates to a method of manufacturing a glass-based flexible cover window in which strength and folding characteristics are secured and visibility at a boundary of a folding portion is improved.

Description of the Related Art

Recently, electric and electronic technologies are rapidly developing, various types of display products are emerging to meet the needs of the new times and various consumers, and among them, research on a flexible display capable of folding and unfolding the screen is being actively performed.

In the case of a flexible display, the research is being performed on a form that basically starts from the fold, bends and stretches, and not only a display panel, but also a cover window to protect the display panel needs to be formed in a flexible manner.

Such a flexible cover window should basically have good flexibility, no marks should be made on the folding part even in repeated folding, and no distortion should occur on image quality during the repeated folding.

Existing flexible display cover windows have used a polymer film such as PI or PET film on the surface of the display panel.

However, in the case of a polymer film, the mechanical strength is low so that the polymer film simply serves to prevent scratches on the display panel, but is vulnerable to impact. The polymer film also has a low transmittance, and is known to be relatively expensive.

In addition, in such a polymer film, as the number of times of folding of the display increases, marks remain on the folding portion, resulting in damage to the folded portion. For example, upon the folding test (usually 200,000 times), the polymer film is compressed or torn.

Recently, various studies on glass-based cover windows have been conducted in order to overcome the limitations of the cover window made of a polymer film.

In the case of a glass-based cover window, basic physical properties are required that satisfy the folding characteristics, have no distortion of the screen, and have sufficient strength even under a certain pressure or repeated contact with a touch pen or the like.

The glass needs not only to have a certain thickness or more to satisfy the strength characteristics of the cover window, but also to have a certain thickness or less to satisfy the folding characteristics of the cover window. Therefore, there is a need for a structure of a cover window that satisfies the strength characteristics and the folding characteristics without distortion of the screen.

As a conventional technology, Korean Unexamined Patent Publication No. 10-2017-0122554 (entitled "Foldable Display Device" is disclosed in which a cover window having a thin folded portion is provided.

In the conventional technology, the cover window has a thickness ranging from 0.2 mm to 2.0 mm, and the minimum thickness of a folded part where the cover window is folded ranges from 0.05 mm to 0.15 mm such that the thickness of the cover window becomes thicker as the distance from a folding line defined as the line with the minimum thickness increases.

However, since the conventional technology is difficult to apply to a light-weight display device because the cover window is a relatively thick, and an improvement of the folding characteristics is required, research is being conducted to improve both the strength characteristics and the folding characteristics by the provision of the cover window using a thin sheet of glass of 2.0 mm or less with a thin folded part.

Due to this need, the present applicant has proposed a flexible cover window (Korean Patent Application No. 10-2019-0027399).

In the above technology, a cover window for a glass-based flexible display is provided, in which a slim folded part is formed in a region in which a display is folded.

Figure 1:
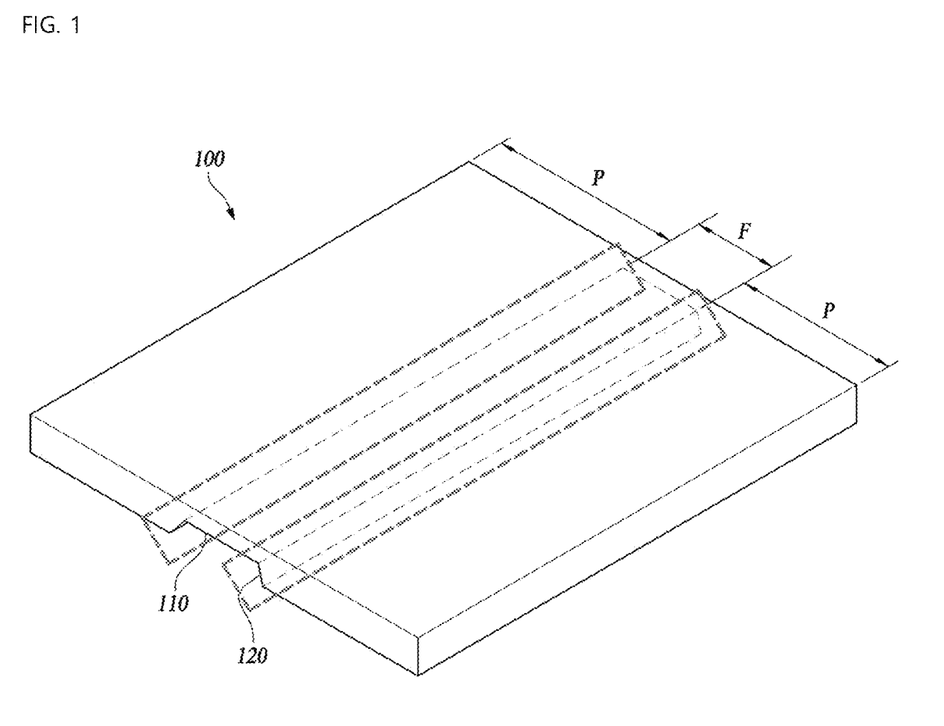
FIG. 1 is a schematic diagram of the existing flexible cover window.

Here, as illustrated in FIG. 1, on both sides, the folded part is gradually thicker to fo u an inclined portion connecting to a planar area of the cover window, which results in poor visibility of the cover window due to light reflection at that portion.

Figure 2:
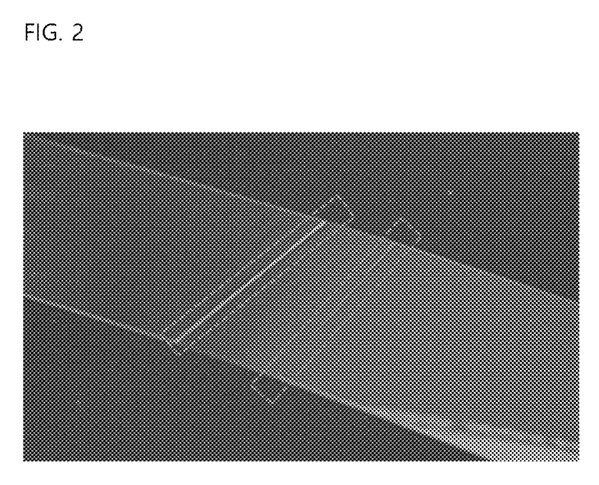
FIG. 2 is a view illustrating the boundary between a folded part and a planar part in the existing flexible cover window.

FIG. 2 illustrates a case in which a reflective surface at a boundary between a folded part and a planar part is visually recognized so that a distortion occurs on the screen or resolution is lowered. Thus, these problems need to be solved when applying a flexible cover window.

In addition, in the case of the cover window in which the folded part F is formed, a chemical reinforcing treatment is performed to reinforce basic folding characteristics and strength. In this case, a required central tension (CT) value according to the chemical reinforcing treatment ranges from 30 MPa to 300 MPa. In other words, if it is less than 30 MPa, the folding strength is insufficient, and if it is more than 300 MPa, there is a risk of a natural explosion due to high compressive stress (CS).

In general, in the chemical reinforcing treatment, the central tension (CT) satisfies the following Equation.

$$CT=(CS \times DOL)/(\text{Glass Thickness} - 2 \times DOL) \quad (CS: \text{compressive stress}, DOL: \text{reinforced depth})$$

Accordingly, when the compressive stress (CS) is the same, the central tension (CT) varies depending on the reinforcing depth DOL and the thickness of the glass.

As illustrated in FIG. 1, in the case of the cover window in which the folded part F having a thin thickness is famed, the central tension (CT) of the planar part P and the folded part F are different from each other during the chemical reinforcing treatment, so it is difficult for the planar part P and the folded part F to simultaneously satisfy 30 MPa to 300 MPa, which is the basic required physical property value of the central tension CT to satisfy the folding characteristics and strength characteristics.

That is, assuming that the reinforced depth DOL value is basically the same since the chemical reinforcing treatment is performed on the entire area of the cover window in which the folded part F is famed, the central tension (CT) of the folded part F having a thin thickness becomes higher than that of the planar part P.

Due to the high compressibility at the folded part according to the unbalance of the central tension (CT) values, spontaneous explosion, breakage, or waviness of the cover window occurs, resulting in serious damage to product quality.

In the case of such a thin flexible cover window, a special technique is required to simultaneously satisfy the folding characteristics and strength characteristics.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a method of manufacturing a flexible cover window in which strength and folding characteristics are secured and visibility at a boundary of a folding part is improved.

In order to achieve the above objective, according to one aspect of the present disclosure, there is provided a method of manufacturing a flexible cover window including: a planar part formed corresponding to a planar portion of a flexible display, and a folded part extending continuously from the planar part and formed corresponding to a folded portion of the flexible display, wherein the folded part is thinner than the planar part, the method including: a first step of forming a photoresist layer on a glass substrate; a second step of patterning the photoresist layer to form a gradation resist pattern layer for forming the folded part on the glass substrate; a third step of forming the folded part having an inclined portion formed between the folded part and the planar part using the gradation resist pattern layer as a mask; a fourth step of removing the gradation resist pattern layer; and a fifth step of reinforcing the glass substrate.

In the gradation resist pattern layer formed in the second step, an area corresponding to a central portion of the folded part may have an open ratio of 90 to 100%, and the open ratio may gradually decrease from the central portion of the folded part to the planar part so that the planar part has an open ratio of 0 to 10%.

The open ratio may be adjusted depending on spacing, size, distribution of pattern holes formed in the gradation resist pattern layer, or a combination thereof.

In the second step, the gradation resist pattern layer may be famed by a photo patterning process using a photo mask having a gradation contrast ratio corresponding to the gradation resist pattern layer.

In the third step, a wet etching may be performed using the gradation resist pattern layer as a mask.

The inclined portion of the folded part may be famed with a slope (A) of 1 to 20° with respect to the planar part, and the inclined portion may have an effective area of 50 to 5000 μm.

In the fifth step, both the planar part and the folded part may be subjected to a primary chemical reinforcing treatment followed by a secondary chemical reinforcing treatment for only the planar part.

In the fifth step, the planar part may be subjected to a primary chemical reinforcing treatment followed by a secondary chemical reinforcing treatment for both the planar part and the folded part.

The first chemical reinforcing treatment may be dipping chemical reinforcing and the second chemical reinforcing treatment may be slurry chemical reinforcing, or the primary chemical reinforcing treatment may be slurry chemical reinforcing and the secondary chemical reinforcing treatment may be dipping chemical reinforcing.

The slurry chemical reinforcing may be implemented by masking the folded part, applying slurry onto the planar part, and then performing an ion substitution heat treatment process.

The masking of the folded part may be implemented by laminating a masking tape on the folded part, wherein the masking tape may have heat resistance at a temperature of 150° C. or more.

The masking of the folded part may be performed by any one of dipping, screen printing, spraying, and slot die, or a masking jig using any one kind of inorganic oxides including $SiO_2$, $TiO_2$, and $ZrO$.

The folded part may be formed on one side or both sides of the cover window, wherein when the folded part is famed on both sides of the cover window, the depth of folded part may be identical or different.

The folded part may be filled with a transparent resin material to be bonded onto the entire surface of the display panel without voids, wherein the transparent resin material fills the folded part and continuously coated on the entire surface of the cover window above the folded part.

According to the glass-based cover window of the present disclosure, the slim folded part is formed corresponding to the area in which the display is folded, thereby providing the cover window having excellent strength and folding characteristics while maintaining the unique texture of the glass.

That is, the glass has a high transmittance due to the inherent excellent optical characteristics, as well as improved scratch resistance and mechanical strength, so that the display panel has excellent visibility and impact resistance.

The inclined portion having a slope of 1° to 20° is famed at the boundary of the folded part and the planar part so that the visual visibility of the reflective surface at the inclined portion is improved, thereby providing a flexible cover window in which screen distortion or boundary visibility is improved.

The reinforcement depth (DOL) of the planar part or the folded part is adjusted so that the central tension (CT) is balanced and the required properties is met, thereby minimizing the problem of explosion and breakage of the glass due to excessive compressive stress (CS) in the folded part, and solving the problem of waviness, whereby the resolution and screen distortion of the product are minimized, product defects are improved, and a high-quality product is provided.

The flexible cover window of the present disclosure is a thin plate with improved strength and folding characteristics, so that the flexible cover window is applicable to a clear polyimide (CPI) cover for protection application.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION OF THE INVENTION

The present disclosure is directed to a glass-based cover window, in particular, a flexible cover window in which visibility at the boundary of a folded part and a planar part is improved, along with maintaining the unique texture of the reinforced glass, and the reinforcement depth (DOL) of the planar part or the reinforcement depth (DOL) of the folded part is adjusted so that the tensile stress is adjusted over the entire area of the flexible cover window, thereby ensuring the strength and folding characteristics.

Hereinafter, the present disclosure will be described in detail with reference to the accompanying drawings.

Figure 3:
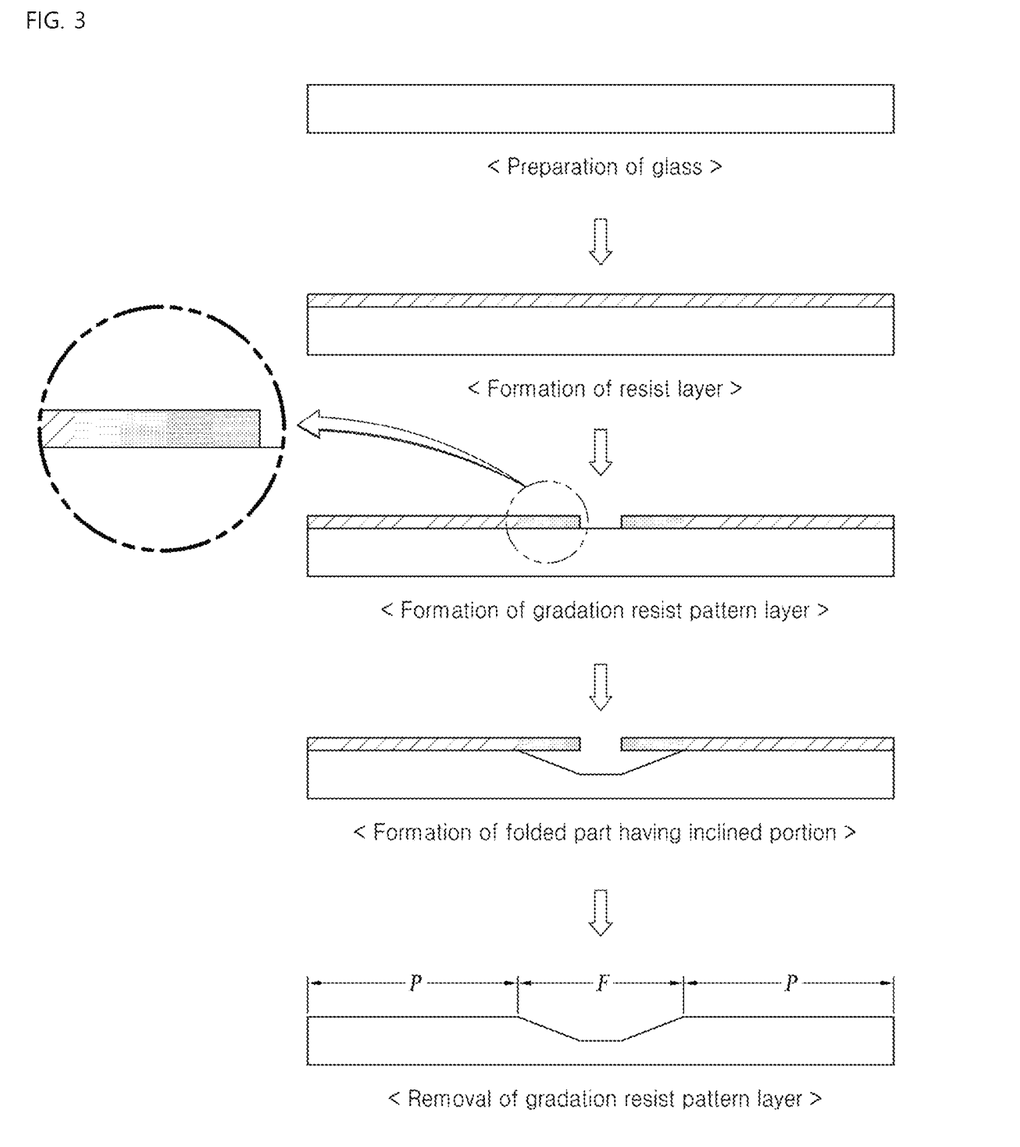
FIG. 3 is a schematic diagram of a gradation photo masking process according to an embodiment of the present disclosure.
Figure 4:
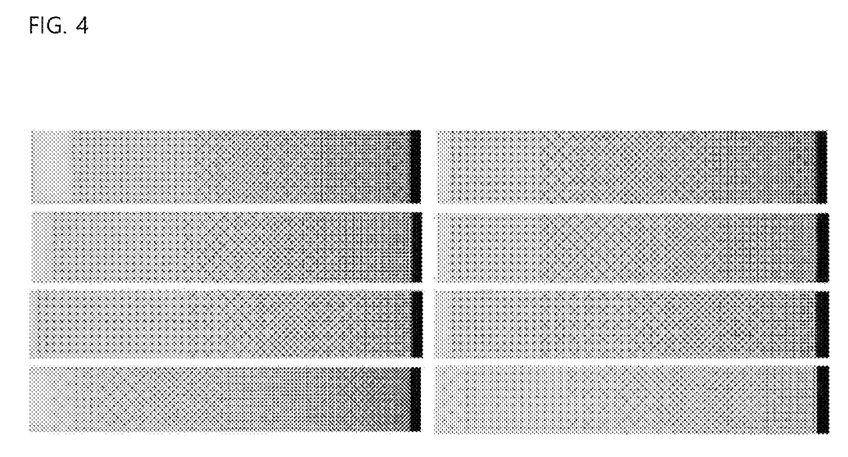
FIG. 4 is a schematic diagram of a gradient resist pattern layer according to various embodiments of the present disclosure.
Figure 5:
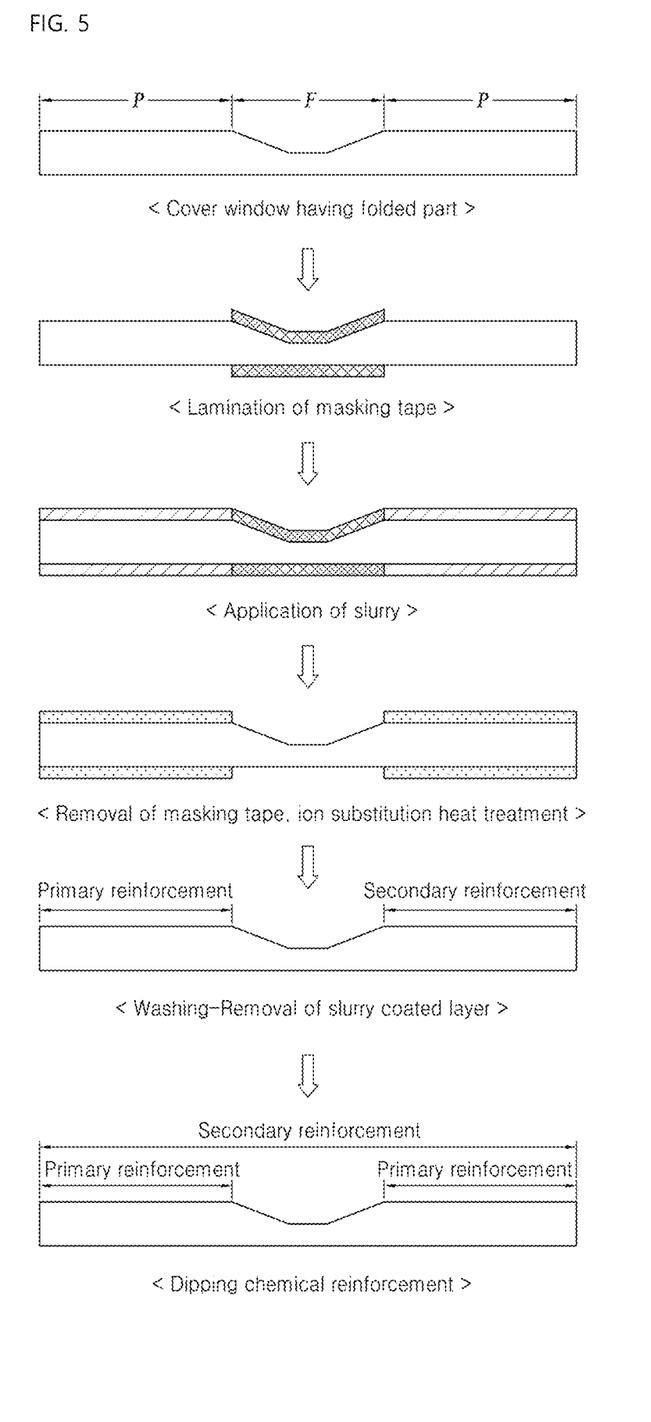
FIG. 5 is a schematic diagram of a reinforcing process according to an embodiment of the present disclosure.

As illustrated in FIGS. 3 to 5, the present disclosure provides a method of manufacturing a flexible cover window including: a planar part P famed corresponding to a planar portion of a flexible display, and a folded part F extending continuously from the planar part P and famed corresponding to a folded portion of the flexible display, wherein the folded part F is thinner than the planar part P, the method including: a first step of forming a photoresist layer on a glass substrate; a second step of patterning the photoresist layer to form a gradation resist pattern layer for foiling the folded part F on the glass substrate; a third step of forming the folded part F having an inclined portion famed between the folded part and the planar part P using the gradation resist pattern layer as a mask; a fourth step of removing the gradation resist pattern layer; and a fifth step of reinforcing the glass substrate.

Here, the area in which a display is folded refers to an area where the display is folded or bent in half, and the area in which a cover window is folded corresponding to the former area is called a "folded part" of the cover window and the area other than the folded part is called a "planar part" of the cover window in the present disclosure.

The folding of the display in the present disclosure includes either in-folding or out-folding, and is applied to a flexible display that can operate in-folding or both in-folding and out-folding.

In the cover window of the present disclosure, the thickness of the planar part P ranges from 50 μm to 200 μm, and the thickness of the folded part F ranges from 10 μm to 45 μm.

The flexible cover window includes a planar part P famed corresponding to a planar portion of the flexible display, and a folded part F extending continuously from the planar part P and formed corresponding to a folded portion of the flexible display, wherein the folded part F is made slim and thinner than the planar part P.

Here, the folded part F may have a uniform thickness, or may have a thickness that is gradually thicker from the central portion toward the outside of the folded part. That is, the folded part F may be famed in a straight or curved shape.

When the folded part F is formed in a straight shape, the folding characteristics are further improved compared to that of the curved shape. In contrast, when the folded part F is famed in a curved shape, the range of the minimum thickness is relatively small so that during repeated folding, degradation in the folding characteristics, such as folding breakage in the thick portion, occurs. However, when the folded part F has a uniform thickness, that is, when the folded part F is formed in a straight line shape with the same thickness, the area forming the minimum thickness is formed to be wider, thereby improving the folding characteristics through increased flexibility, restoration force, and elastic force.

In addition, the curved folded part F is not easy to align the center when assembling mechanically, but the folded part F according to the present disclosure is formed to have a uniform thickness, so that when assembling mechanically, that is, when coupling to the entire surface of the display panel, the assembly tolerance can be reduced thus minimizing the quality difference between products and reducing the defect rate.

Although the straight folded part has more advantages than the curved folded part as described above, either a straight folded part or a curved folded part may be selectively manufactured according to the specifications of a product.

Here, the slimming of the folded part F is performed by one or more of wet etching, polishing, laser forming and masking using masking ink or Dry Film Photo Resist (DFR), or wet etching, laser forming, or masking process using a polishing process as a post process.

Here, the width of the folded part F is designed in consideration of the radius of curvature when the cover window 100 is folded, wherein the radius of curvature is approximately set to $x\pi$, and the thickness of the cover window in the folded part F is formed to be 10 μm to 45 μm, which is related to the folded part F.

When the folded part F is formed to be excessively deep, that is, when the folded area of the cover window is famed to be excessively thin, the folding characteristics are good, but when reinforced, folds occur or the strength is reduced, and when the folded area is famed to be excessively thick, the flexibility, restoration force, and elastic force are degraded and thus the folding characteristics are deteriorated. Accordingly, the thickness of the cover window in the folded part F is preferably 10 μm to 45 μm.

The cover window is a glass-based cover window having a thickness of about 50 μm to 200 μm, and is used after chemical reinforcing treatment. In this thickness, the width, depth, or the like of the folded part F is suitably designed as described above. Below the above-mentioned thickness, the folded area of the cover window after the formation of the folded part F becomes too thin, resulting in the above problems, and even above the above-mentioned thickness, flexibility, restoring force, and elasticity are degraded due to the glass-based material, resulting in interfere with the lightening of a display product.

In an embodiment of the present disclosure, the folded part F is famed in a shape of rectangular trench as a whole in a form slimming inward from the folded area of the cover window, wherein the folded part F has on both sides thereof an inclined portion whose thickness is gradually increased from the central side toward the outer side so that the folded part connects to the planar parts of the cover window 100.

In particular, by forming the inclined portion with a low slope at both sides of the folded part F (at the boundaries with the planar parts), the reflection angle by the reflective surface in the entire area of the folded part F is similarly adjusted to prevent optical interference and improve the visibility at the reflective surface.

To this end, the present disclosure aims at providing the folded part F having inclined portion using a gradation photo masking process.

As illustrated in FIG. 3, the gradation photo masking process (first to fourth steps) includes coating photoresist or laminating dry film resist (DFR) on a glass substrate to form a photoresist layer, patterning the resist layer to form a gradation resist pattern layer for forming the folded part F on the glass substrate, forming the folded part F having an inclined portion with the boundary with the planar part, using the gradation resist pattern layer as a mask, and removing the gradation resist pattern layer.

In the gradation photomasking process, first, a glass substrate is prepared, a photoresist coating is coated or a dry film resist (DFR) is laminated on the glass substrate to form a resist layer, and the gradation resist pattern layer is formed on the glass substrate by the patterning process in which the resist layer is exposed and developed.

The gradation resist pattern layer may be famed by a photo patterning process using a photo mask having a gradation contrast ratio corresponding to the gradation resist pattern layer.

In the gradation resist pattern layer, an area corresponding to the central portion of the folded part F has an open ratio of 90% to 100%, and the open ratio gradually decreases from the central portion of the folded part F toward the planar part P so that the planar part P has an open ratio of 0% to 10%.

Here, the open ratio is adjusted depending on any one or more of spacing, size, and distribution of pattern holes formed in the gradation resist pattern layer.

By performing wet etching using the gradation resist pattern layer as a mask, an inclined portion is famed corresponding to the gradation resist pattern layer.

That is, the gradient of the inclined portion can be adjusted using the gradation resist pattern layer, and the etch rate is adjusted by controlling the open ratio of the gradation resist pattern layer in the area corresponding to the inclined portion.

The adjustment of the open ratio of the resist layer may be implemented by one or more of spacing, size, and distribution of pattern holes formed in the gradation resist pattern layer.

FIG. 4 illustrates a pattern hole (black) of a gradation resist pattern layer according to various embodiments, in which the etch rate is highest at the central portion of the folded part F, and the etch rate decreases toward the boundary to form the inclined portion.

That is, pattern holes having an open ratio of 90% to 100% are formed in correspondence with the central portion of the folded part F, and wet etching is performed through the pattern holes so that an etching solution follows through the pattern holes to allow the wet etching.

In addition, the central portion of the folded part F is etched and at the same time, both sides of the folded part F are also etched, wherein the both sides have an open ratio lower than that of the central portion, and the etchant flows through the pattern holes having a certain open ratio so that the wet etching is performed at an etching rate lower than that of the central portion of the folded part F.

The slope of the inclined portion is regulated by gradually lowering the open ratio toward the both sides of the folded part F to decrease the etch rate from the central portion toward the both sides of the folded part F.

The open ratio is adjusted according to the slope or effective region of the designed inclined portion so that the etch rate is gradually adjusted accordingly, thereby forming a predetermined slope on the inclined portion.

Figure 6:
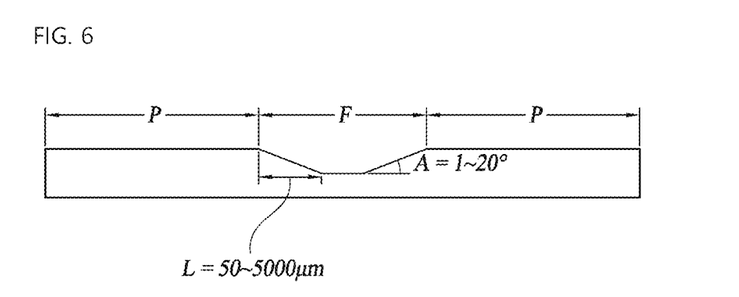
FIGS. 6 to 14 are schematic diagrams illustrating various embodiments of a flexible cover window according to the present disclosure.

As illustrated in FIG. 6, the effective region L of the inclined portion is determined according to the slope of the inclined portion, and appropriately ranges from about 50 μm to 5000 μm. In this case, the slope A of the inclined portion 120 preferably ranges from 1° to 20° based on the planar part P.

The slope of the inclined portion 120 is provided for minimizing the boundary visibility by light reflection. In other words, when there is no slope (90°) in the inclined portion (the boundary), the reflective surface at the boundary is visually recognized by the side reflection of the planar part P, thereby resulting in distortion or reduced resolution of the screen. Accordingly, the cover window according to the present disclosure minimizes the boundary visibility by connecting the folded part F and the planar part P with a gentle slope.

The glass substrate on which the folded part F having the inclined portion is famed is subjected to a reinforcing process (fifth step) as illustrated in FIG. 5, and the reinforcing process is generally performed by a chemical reinforcing process.

In the case of the cover window 100 having the thin folded part F, the central tension (CT) values of the planar part P and the folded part F are different from each other during the chemical reinforcing treatment. Thus, since it is difficult to simultaneously satisfy the folding and strength characteristics of the planar part P and the folded part F, an additional chemical process is further performed (adjustment of the reinforcement depth (DOL)) in the planar part P.

In the present disclosure, both the planar part P and the folded part F may be subjected to a primary chemical reinforcing treatment followed by a secondary chemical reinforcing treatment for only the planar part P, or otherwise, the planar part P may be subjected to a primary chemical reinforcing treatment followed by a secondary chemical reinforcing treatment for both the planar part P and the folded part F.

Here, the chemical reinforcing treatment may be performed by a process such as chemical dipping, chemical slurry, or paste reinforcing.

Preferably, the primary chemical reinforcing treatment may be dipping chemical reinforcing and the secondary chemical reinforcing treatment may be slurry chemical reinforcing, or the primary chemical reinforcing treatment may be slurry chemical reinforcing and the secondary chemical reinforcing may be dipping chemical reinforcing.

Here, the slurry chemical reinforcing is implemented by masking the folded part F, applying slurry onto the planar part P, and then performing an ion substitution heat treatment process.

That is, after primarily performing the dipping chemical reinforcing treatment on the entire area of the glass including the planar part P and the folded part F for securing the strength, the secondary chemical reinforcing treatment using slurry is performed only on the planar part P.

Alternatively, after primarily performing the dipping chemical reinforcing treatment only on the planar part P, the secondary chemical reinforcing treatment using slurry is performed on the planar part P and folded part F.

In the slurry chemical reinforcing, masking of the folded part F should be first performed. Here, the folded part F is masked by laminating a masking tape on the folded part. In addition, after slurry is applied onto the planar part P, the masking tape is removed and then the ion substitution heat treatment process is performed. Then, a washing process (using DI water) is performed to remove the slurry coated layer. Here, the removal of the masking tape may be performed after the ion substitution heat treatment process.

The masking tape has heat resistance at a temperature of 150° C. or more, and may be a heat-resistant film, such as polyimide, Kapton, and silicone, a heat-resistant film having an acrylic or silicone-based adhesive, a heat-resistant film including a polyamide film, a polyetherimide film, a low-adhesive agent, and carbon black, or the like. The masking tape is laminated on the region other than a portion for ion substitution. That is, the masking tape is laminated only on the folded part F.

As the masking of the folded part F, a masking coating agent may be famed by any one of dipping, screen printing, spraying, and slot die, or a masking jig using any one kind of inorganic oxides including $SiO_2$, $TiO_2$ and ZrO. In addition, after applying the slurry onto the planar part P, the masking coating agent or the masking jig is removed, the ion substitution heat treatment process is performed, and a washing process (using DI water) is performed to remove the slurry coated layer. Here, the removal of the masking coating agent or masking jig may be performed after the ion substitution heat treatment process.

In the slurry applying process performed on the planar part P, a slurry in which a nano-sized oxide support such as $SiO_2$, $TiO_2$, ZrO, or the like, and a $KMO_3$ solution (DI water 3000 g: KNOB 1000 g: $SiO_2$ 300 g) are mixed is applied. The applying process uses dipping, screen printing, spraying, slot die, or the like.

Further, heat treatment for ion substitution is performed at a temperature of 350° C. to 480° C. The heat treatment temperature and time may vary depending on the target CS or DOL.

In general, in the slurry chemical reinforcing process, ion substitution is performed by substitution of ions ($Na^+$) having a small size on the glass surface by large ions ($K^+$) of $KMO_3$ contained in the slurry, during heat treatment. Here, the nano-sized oxide support allows uniform dispersion of $KNO_3$ in the solution to improve the coating properties of the glass surface during coating and heat treatment.

After performing the primary chemical reinforcing treatment process as described above, a chemical reinforcing process is further performed on the planar part P to minimize the difference in central tension (CT) according to the thickness difference between the planar part P and the folded part so that the reinforcement depth (DOL) of the planar part P is made deeper. Thus, CT of the planar part P that is lower than that of the folded part F may be adjusted to the level of the folded part F.

By adjusting the reinforcement depth (DOL) of the planar part P in this way, the planar part P and the folded part F simultaneously satisfy physical properties (30 to 300 MPa) required for securing the folding and strength characteristics of the flexible cover window.

FIG. 5 illustrates an exemplary embodiment of the chemical reinforcing including a slurry chemical reinforcing process as a primary chemical reinforcing treatment, and a dipping chemical reinforcing process as a secondary chemical reinforcing treatment, wherein a masking tape is laminated on the folded part F, slurry is applied on the planar part P, the masking tape is removed, an ion substitution heat treatment process is performed, a slurry coated layer is removed, and a dipping chemical reinforcing process is performed on the entire region of the folded part and the planar part.

Accordingly, the primary and secondary chemical reinforcing treatments are performed on the planar part, while only the secondary chemical reinforcing treatment is performed on the folded part.

Figure 7:
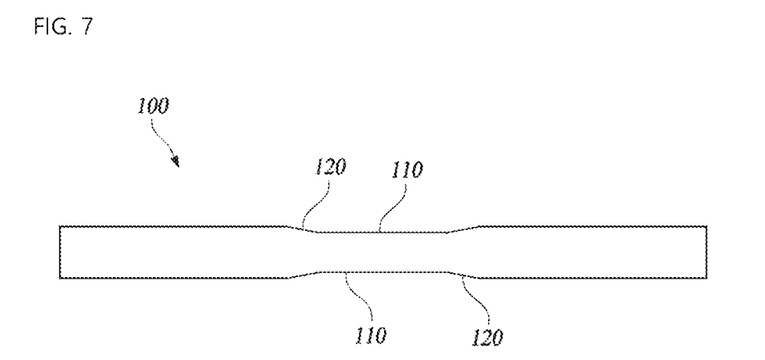

Meanwhile, the folded part 110 may be formed on one side of the cover window 100 as illustrated in FIG. 6, or on both sides of the cover window 100 as illustrated in FIG. 7. This is selectively determined according to the specifications of a display product.

In particular, when the folded part 110 is formed on both sides of the cover window 100, the folded part 110 may have the same or different depth. Preferably, the folded part 110 may be formed to be deeper on the back side of the cover window 100 to be touched by a user than the front side thereof. This is for minimizing the user's physical touch sensation and foreignness while securing strength and folding characteristics.

Figure 8:
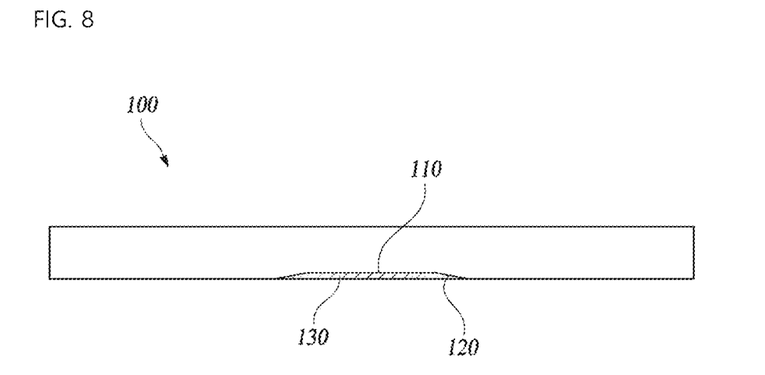

In addition, as illustrated in FIG. 8, the folded part 110 is filled with a transparent resin material 130 so as to be attached on the entire surface of the display panel without voids.

That is, the transparent resin material 130 fills the folded part 110 to provide a cover window 100 having a uniform thickness as a whole without forming voids (air gaps) on the entire surface of the display panel when attached thereto.

In the case of the existing cover window, there is a gap (air layer) with the front surface of the display panel, resulting in various problems such as distortion in display quality due to the difference in refractive index between the glass and air, decrease in the touch response speed, and the attachment degradation between the cover window and the display panel about the gaps.

In the present disclosure, the folded part 110 is filled with the transparent resin material 130 having a substantially equal refractive index as the glass (1.5), thereby solving the problems.

The transparent resin material 130 is formed of an optical clear resin (OCR), such as acrylic resin, epoxy, silicone, urethane, urethane composite, urethane acrylic composite, hybrid sol gel, siloxane-based resin, or the like. The transparent resin material may be mixed in various combinations depending on the properties of the resin materials for reinforcing strength and elasticity.

Figure 9:
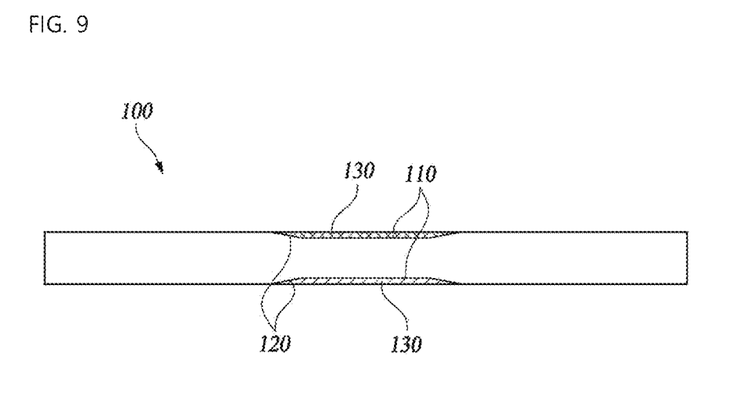

In addition, as illustrated in FIG. 9, when the folded part 110 is formed on both sides of the cover window 100, the transparent resin material 130 filling the folded part 110 on the back side (extended side) of the cover window 100 is preferably famed of a material that is relatively softer than the transparent resin material 130 filling the folded part 110 on the front side (folded side) of the cover window.

This is because the transparent resin material 130 is filled with both a relatively hard material on the side to be touched by a user so that durability is maintained, and a relatively soft material on the side to be extended so that cracks are restricted from being generated on the extended side.

Figure 10:
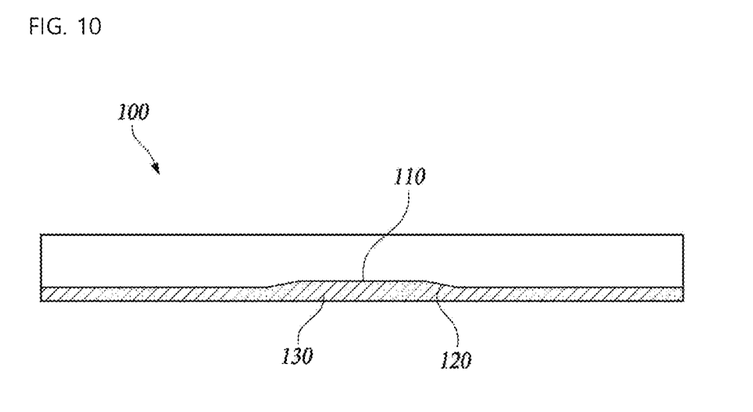
Figure 11:
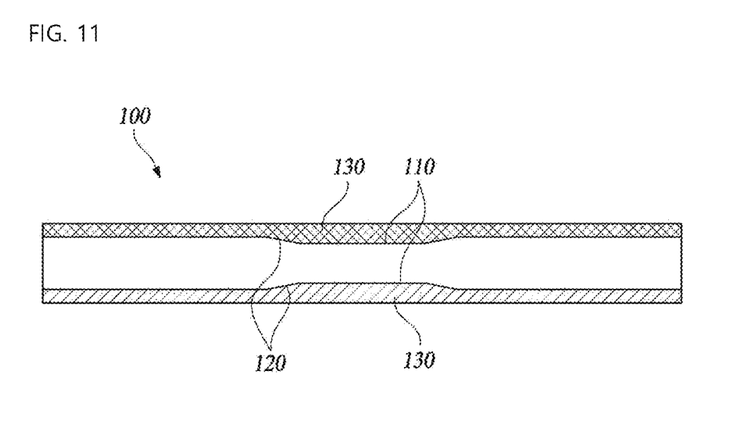

In addition, as illustrated in FIGS. 10 and 11, the transparent resin material 130 may fill the folded part 110 and may be continuously coated on the entire surface of the cover window 100 above the folded part 110.

This prevents the occurrence of cracks in the folded part, minimizes the folded part 110 from being visually recognized from the outside, and allows the transparent resin material 130 to be evenly filled in the folded part 110 to secure the flatness of the portion to be in contact with the display panel. In addition, on the side in contact with the display panel, the cover window 100 is reinforced with elasticity to improve impact resistance, thereby serving to prevent the glass from being scattered when broken.

Figure 12:
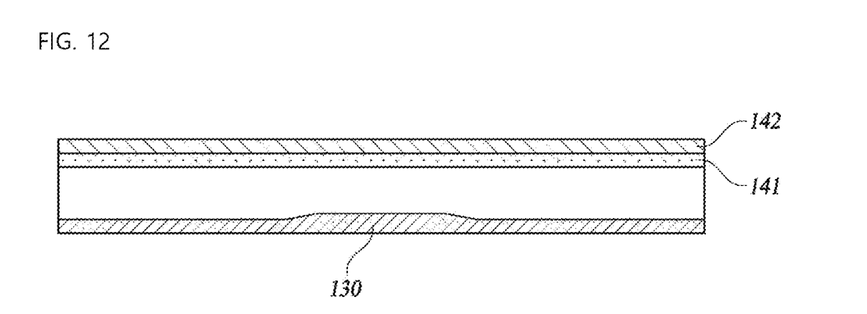
Figure 13:
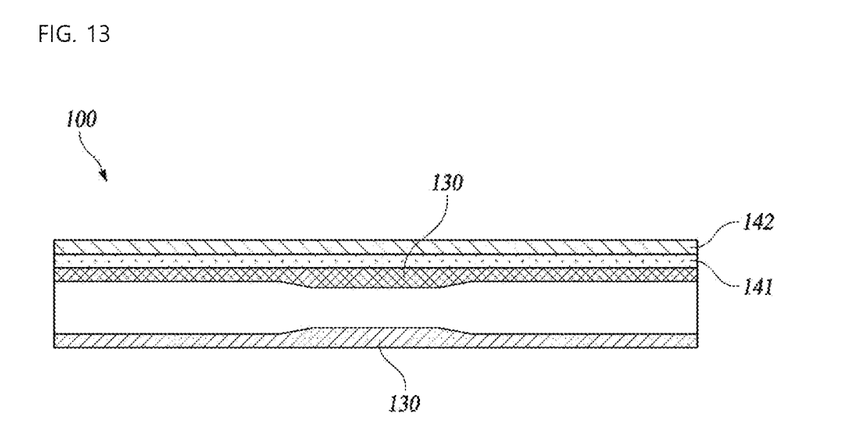

Meanwhile, as illustrated in FIGS. 12 and 13, a functional coating layer may be further formed on one side or both sides of the cover window 100. The functional coating layer is formed of a transparent material such as the above-described transparent resin material 130, and may have functionality by synthesizing resins having various properties.

The functional coating layer is formed on the upper layer of the transparent resin material 130 when filling the folded part 110 or coated on the entire surface of the cover window 100 and the folded part 110. The functional coating layer may be formed by a known resin coating method such as spraying, dipping, spin coating, or the like.

The functional coating layer may be formed in a single layer or a multi-layer, the functional coating layer formed on the front surface of the cover window 100 may be implemented as a strength-reinforced layer (a hard coating), and the functional coating layer formed on the back surface of the cover window 100 may be implemented as an elasticity-reinforced layer (a soft coating).

In other words, the front side of the cover window is implemented as a strength-reinforced functional coating layer due to a touch action being performed on the front side, and the back side of the cover window is implemented as an elasticity-reinforced functional coating layer to provide a buffering operation with respect to the display panel.

The strength-reinforced layer (hard coating) on the front side of the cover window is mainly formed of a resin having relatively high hardness when cured, such as an acrylic or epoxy resin, and the elasticity-reinforced layer (soft coating) on the back side of the cover window is mainly formed of a resin having relatively high elasticity when cured, such as silicone, urethane synthetic resin, or the like. Here, the strength or elasticity may be reinforced by adjusting the content of organic and inorganic substances in the organic-inorganic hybrid sol gel.

In addition, when the functional coating layer is foiled in multiple layers, the functional coating layer famed on the front side of the cover window 100 is preferably formed of a material that is hard toward the upper layer.

FIG. 12 illustrates the case in which the functional coating layer formed on the front surface of the cover window 100 is formed in two layers including first and second functional coating layers 141 and 142, wherein the second functional coating layer 142 is made of a relatively harder material than the first functional coating layer 141.

In addition, the functional coating layer, especially formed on the uppermost layer, can be given an anti-finger (AF) or anti-reflective (AR) function, and the functional coating layer may be implemented by synthesizing a resin having such a function, or may be implemented to form various patterns, such as moth eye.

As described above, the cover window 100 according to the present disclosure is basically formed with an additional functional coating layer to reinforce the strength and elasticity of the thin glass substrate to protect the cover window 100 from external shock and the pressure of a touch pen.

In addition, the functional coating layer further prevents the occurrence of cracks in the folded part, and reinforces elasticity to the cover window 100 on the surface in contact with the display panel to improve impact resistance and prevent scattering.

Figure 14:
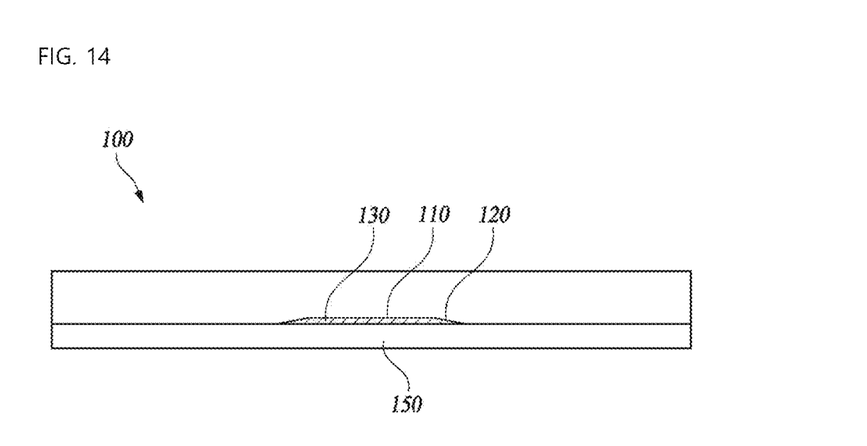

Meanwhile, as illustrated in FIG. 14, the cover window 100 according to the present disclosure is characterized in that a bonding film 150 is further famed on one side or both sides of the cover window 100. The bonding film 150 and the cover window 100 are bonded using an optical clear adhesive (OCA). The bonding film 150 may be famed on the front side, the back side, or both sides of the cover window 100, or on the upper layer of the functional coating layer, or may be famed instead of the functional coating layer.

The bonding film 150 may have a thickness ranging from 0.025 mm to 0.150 mm, and may be used as an anti-splinter film (ASF).

The bonding film 150 is intended to improve physical properties of the cover window 100 to improve bending properties or impact resistance.

That is, the cover window 100 made of glass serves to maintain the shape according to the improvement of flexibility, resilience and elasticity, and mechanical strength, and the bonding film 150 supplements the bendability and improves the impact resistance according to the elastic protection.

The bonding film 150 includes either one of transparent polycarbonate (PC), polyacrylate (PA), polyvinylalcohol (PVA), polyimide (PI), and polyethylene terephthalate (PET).

In addition, when the bonding film 150 is famed on the front surface of the cover window 100, the bonding film 150 may be provided with functionality by AR treatment, AF treatment, or a combination thereof.

As described above, the present invention is a glass-based cover window 100, in which the slim folded part is famed corresponding to the area in which the display is folded, the thickness of the cover window 100 is 50 to 200 μm, and the folding part 110 has a thickness of 10 to 45 μm, thereby having excellent strength and folding characteristics while maintaining a unique texture of the flexible cover window 100 glass.

In addition, in order to adjust the reinforcement depth (DOL) of the planar part P or the folded part F, the reinforcement of the folded part F is made smaller than that of the planar part P, or if the compressive stress (CS) is the same, the reinforcement depth (DOL) in the folded part F is lowered, or if the compressive stress (CS) is different, the reinforcement depth (DOL) of the folded part F is properly lowered, thereby balancing the central tension (CT) of the planar part P and the folded part F and thus providing required physical properties for the flexible cover window 100.

Accordingly, the central tension (CT) between the planar part P and the folded part F is balanced, the required physical properties are satisfied to minimize the problem of explosion and breakage of the glass due to excessive compressive stress (CS) in the folded part while solving the problem of waviness, whereby the resolution and screen distortion of the product are improved, product defects are improved, and a high-quality product is provided.

In addition, by filling the folded part with the transparent resin material 130 according to the present disclosure, there is no gap with the front side of the display panel, so that distortion of the display image quality can be minimized, and the problems of degradation in the touch response speed and in adhesion between the display panel and the cover window are improved.

Further, the flexible cover window of the present disclosure is a thin plate with improved strength and folding characteristics, so that the flexible cover window is applicable to a clear polyimide (CPI) cover for protection application.

Although the present disclosure has been described and illustrated with respect to the specific embodiments, those skilled in the art will appreciate that various improvements and modifications are possible, without departing from the scope and spirit of the present disclosure as disclosed in the accompanying claims.

What is claimed is:

1. A method of manufacturing a flexible cover window comprising: a planar part formed corresponding to a planar portion of a flexible display, and a folded part extending continuously from the planar part and formed corresponding to a folded portion of the flexible display, wherein the folded part is thinner than the planar part, the method comprising:
   a first step of forming a photoresist layer on a glass substrate;
   a second step of patterning the photoresist layer to form a planar gradation resist pattern layer for forming the folded part on the glass substrate, wherein in the planar gradation resist pattern layer, an area above a central portion of the folded part has an open ratio of 100%, and the open ratio gradually decreases from the central portion of the folded part to the planar part so that the planar part has an open ratio of 0%;
   a third step of forming the folded part having an inclined portion formed between the folded part and the planar part by performing wet etching using the gradation resist pattern layer as a mask, so that the planar gradation resist pattern layer extends over the inclined portion; and
   wherein the open ratio is adjusted depending on spacing, size, distribution of pattern holes formed in the gradation resist pattern layer, or a combination thereof;
   a fourth step of removing the gradation resist pattern layer; and
   a fifth step of reinforcing the glass substrate; wherein in the fifth step, both the planar part and the folded part are subjected to a primary chemical reinforcing treatment followed by a secondary chemical reinforcing treatment for only the planar part, or wherein in the fifth step, the planar part is subjected to a primary chemical reinforcing treatment followed by a secondary chemical reinforcing treatment for both the planar part and the folded part; and wherein the primary chemical reinforcing treatment is dipping chemical reinforcing and the secondary chemical reinforcing treatment is slurry chemical reinforcing, or the primary chemical reinforcing treatment is slurry chemical reinforcing and the secondary chemical reinforcing treatment is dipping chemical reinforcing; and
   wherein the inclined portion of the folded part is formed with a slope (A) of 1 to 20° with respect to the planar part.

2. The method according to claim 1, wherein in the second step, the gradation resist pattern layer is formed by a photo patterning process using a photo mask having a gradation contrast ratio corresponding to the gradation resist pattern layer.

3. The method according to claim 1, wherein the inclined portion has an effective area of 50 to 5000 μm.

4. The method according to claim 1, wherein the slurry chemical reinforcing is implemented by masking the folded part, applying slurry onto the planar part, and then performing an ion substitution heat treatment process.

5. The method according to claim 4, wherein the masking of the folded part is implemented by laminating a masking tape on the folded part.

6. The method according to claim 5, wherein the masking tape has heat resistance at a temperature of 150° C. or more.

7. The method according to claim 4, wherein the masking of the folded part is performed by any one of dipping, screen printing, spraying, and slot die, or a masking jig using any one kind of inorganic oxides including $SiO_2$, $TiO_2$, and $ZrO$.

8. The method according to claim 1, wherein the folded part is formed on one side or both sides of the cover window.

9. The method according to claim 8, wherein when the folded part is formed on both sides of the cover window, the depth of folded part is identical or different.

10. The method according to claim 8, wherein the folded part is filled with a transparent resin material to be bonded onto the entire surface of the display panel without voids.

11. The method according to claim 10, wherein the transparent resin material fills the folded part and continuously coated on the entire surface of the cover window above the folded part.

* * * * *